United States Patent
Lim

(10) Patent No.: US 12,149,738 B2
(45) Date of Patent: Nov. 19, 2024

(54) MPEG MEDIA TRANSPORT (MMT) SIGNALING OF VISUAL VOLUMETRIC VIDEO-BASED CODING (V3C) CONTENT

(71) Applicant: Samsung Electronics Co., Ltd., Suwon-si (KR)

(72) Inventor: Youngkwon Lim, Allen, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 114 days.

(21) Appl. No.: 17/715,810

(22) Filed: Apr. 7, 2022

(65) Prior Publication Data

US 2022/0329857 A1 Oct. 13, 2022

Related U.S. Application Data

(60) Provisional application No. 63/174,341, filed on Apr. 13, 2021.

(51) Int. Cl.
*H04N 19/597* (2014.01)
*H04N 19/105* (2014.01)
*H04N 19/172* (2014.01)
*H04N 19/46* (2014.01)

(52) U.S. Cl.
CPC ......... *H04N 19/597* (2014.11); *H04N 19/105* (2014.11); *H04N 19/172* (2014.11); *H04N 19/46* (2014.11)

(58) Field of Classification Search
CPC .... H04N 19/105; H04N 19/172; H04N 19/46; H04N 19/597; H04N 19/70
See application file for complete search history.

(56) References Cited

U.S. PATENT DOCUMENTS

| | | |
|---|---|---|
| 11,012,713 B2 | 5/2021 | Kim et al. |
| 11,170,556 B2 | 11/2021 | Oh |
| 11,265,562 B2 | 3/2022 | Toma et al. |
| 2019/0318488 A1 | 10/2019 | Lim et al. |
| 2020/0112709 A1 | 4/2020 | Lim |

(Continued)

FOREIGN PATENT DOCUMENTS

| | | |
|---|---|---|
| KR | 10-2021-0022100 A | 3/2021 |
| WO | 2019079032 A1 | 4/2019 |

(Continued)

OTHER PUBLICATIONS

International Search Report and Written Opinion issued Jul. 7, 2022 regarding Application No. PCT/KR2022/005301, 9 pages.
Extended European Search Report issued Apr. 29, 2024 regarding Application No. 22788409.5, 12 pages.
Hamza et al., "On MMT Signalling for V3C in MPEG-I Part 10", ISO/IEC JTC1/SC29/WG3 m55946, Jan. 2021, 9 pages.
"Technologies under consideration on carriage of V3C data", ISO/IEC JTC 1/SC 29/WG 03 N0109, Oct. 2020, 82 pages.

(Continued)

*Primary Examiner* — Michael J Hess
*Assistant Examiner* — Naod W Belai

(57) ABSTRACT

A point cloud encoding device includes a point cloud encoding device includes a communication interface and a processor operably coupled to the communication interface. The communication interface is configured to receive a plurality of independent bitstreams. The communication interface is also configured to receive a grouping message indicating a group of assets from the plurality of independent bitstreams containing visual volumetric coding (V3C) content. The processor is configured to select the group of assets based on the grouping message. The processor is configured to decode at least the selected group of assets.

20 Claims, 9 Drawing Sheets

(56) References Cited

U.S. PATENT DOCUMENTS

| | | |
|---|---|---|
| 2020/0314449 A1 | 10/2020 | Fleureau et al. |
| 2021/0005016 A1 | 1/2021 | Oh |
| 2021/0099754 A1 | 4/2021 | Yip et al. |
| 2021/0112278 A1 | 4/2021 | Wang |
| 2022/0329857 A1* | 10/2022 | Lim .................... H04N 19/70 |

FOREIGN PATENT DOCUMENTS

| | | |
|---|---|---|
| WO | 2019202207 A1 | 10/2019 |
| WO | 2020055869 A1 | 3/2020 |
| WO | 2020185578 A1 | 9/2020 |
| WO | WO-2022150376 A1 * | 7/2022 |

OTHER PUBLICATIONS

Xu et al., "MMT signalling of user interaction feedback information for V3C data", ISO/IEC JTC1/SC29/WG3 m5xxxx, Jan. 2021, 6 pages.

Lim et al., "MMT signalling of V3C Content", ISO/IEC JTC 1/SC 29/WG 03 m56534, Apr. 2021, 11 pages.

"Information technology—Coded representation of immersive media—Part 10: Carriage of visual volumetric video-based coding data", 1SO/IEC 23090-10:2021(E), 1S0/IEC JTC1/SC 29/WG 3, Aug. 2021, 89 pages.

\* cited by examiner

MPEG MEDIA TRANSPORT (MMT) SIGNALING OF VISUAL VOLUMETRIC VIDEO-BASED CODING (V3C) CONTENT

CROSS-REFERENCE TO RELATED APPLICATION AND PRIORITY CLAIM

This application claims priority under 35 U.S.C. § 119(e) to U.S. Provisional Patent Application No. 63/174,341 filed on Apr. 13, 2021, which is hereby incorporated by reference in its entirety.

TECHNICAL FIELD

This disclosure relates generally to visual volumetric video-based coding (V3C) content devices and processes. More specifically, this disclosure relates to moving pictures experts group (MPEG) media transport (MMT) signaling of V3C content.

BACKGROUND

Three hundred sixty degree (360°) video and 3D volumetric video are emerging as new ways of experiencing immersive content due to the ready availability of powerful handheld devices such as smartphones. While 360° video enables immersive "real life," "being there" experience for consumers by capturing the 360° outside-in view of the world, 3D volumetric video can provide complete six degree of freedom (6DoF) experience of being and moving within the content. Users can interactively change their viewpoint and dynamically view any part of the captured scene or object they desire. Display and navigation sensors can track head movement of the user in real-time to determine the region of the 360° video or volumetric content that the user wants to view or interact with. Multimedia data that is three-dimensional (3D) in nature, such as point clouds are can be used in the immersive environment.

SUMMARY

This disclosure provides for MMT signaling of V3C content.

In a first embodiment, a point cloud encoding device includes a communication interface and a processor operably coupled to the communication interface. The communication interface is configured to receive a plurality of independent bitstreams. The communication interface is also configured to receive a grouping message indicating a group of assets from the plurality of independent bitstreams containing visual volumetric coding (V3C) content. The processor is configured to selected the group of assets based on the grouping message. The processor is also configured to decode at least the selected group of assets.

In a second embodiment, a method includes receiving, by a communication interface of a decoding device, a plurality of independent bitstreams. The method also includes receiving, by the communication interface, a grouping message indicating a group of assets from the plurality of independent bitstreams containing visual volumetric coding (V3C) content. The method further includes selecting, by a processor operably coupled to the communication interface, the group of assets based on the grouping message. The method additionally includes decoding, by the processor, at least the selected group of assets.

In a third embodiment, a point cloud encoding device includes a processor and a communication interface operably coupled to the processor. The processor is configured to encode a grouping message indicating a group of assets for a plurality of independent bitstreams containing visual volumetric coding (V3C) content. The communication interface is configured to transmit the plurality of independent bitstreams and the grouping message.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, described below, and the various embodiments used to describe the principles of the present disclosure are by way of illustration only and should not be construed in any way to limit the scope of the disclosure. Those skilled in the art will understand that the principle of the present disclosure may be implemented in any type of suitably arranged device or system.

Figure 1:
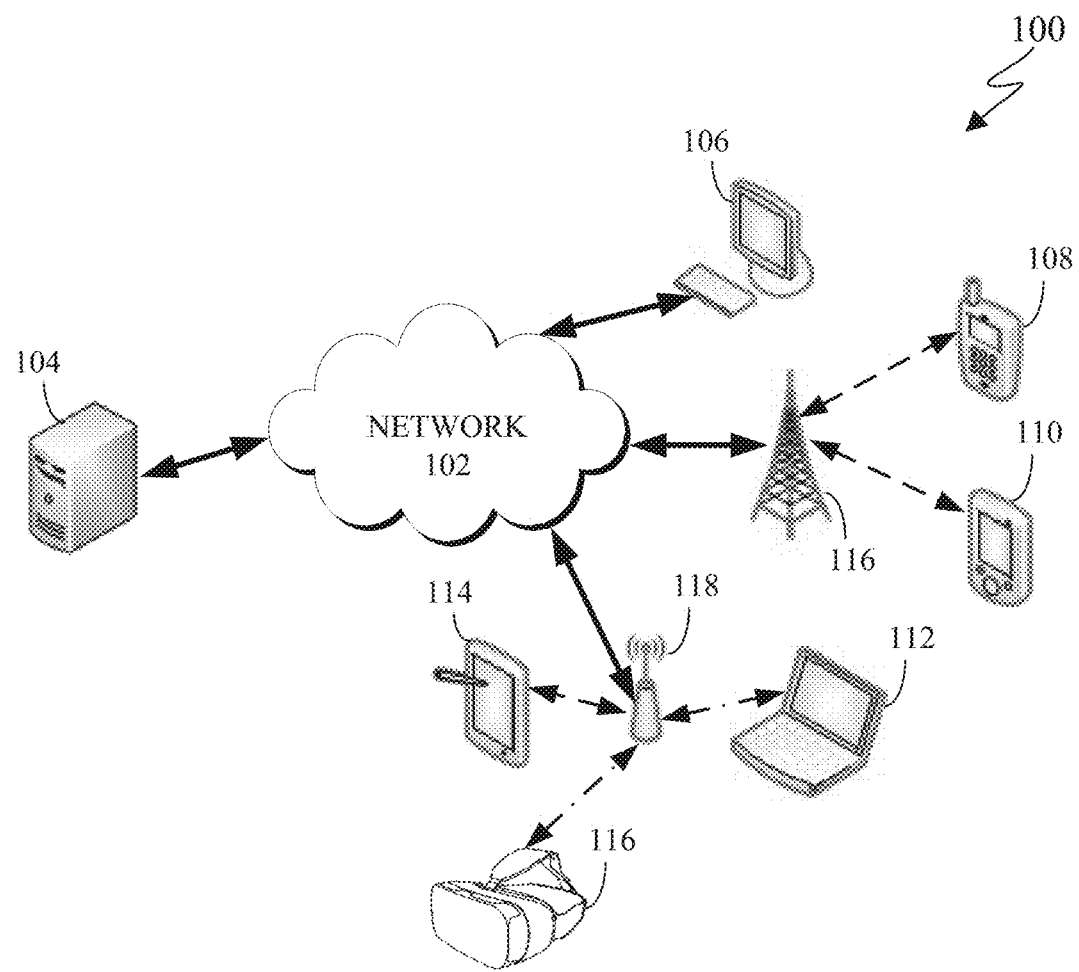
FIG. 1 illustrates an example communication system in accordance with an embodiment of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 can then compress 3D point cloud to generate a bitstream and then transmit the bitstream to one or more of the client devices 106-116. For another example, one of the client devices 106-116 can compress a 3D point cloud to generate a bitstream and then transmit the bitstream to another one of the client devices 106-116 or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
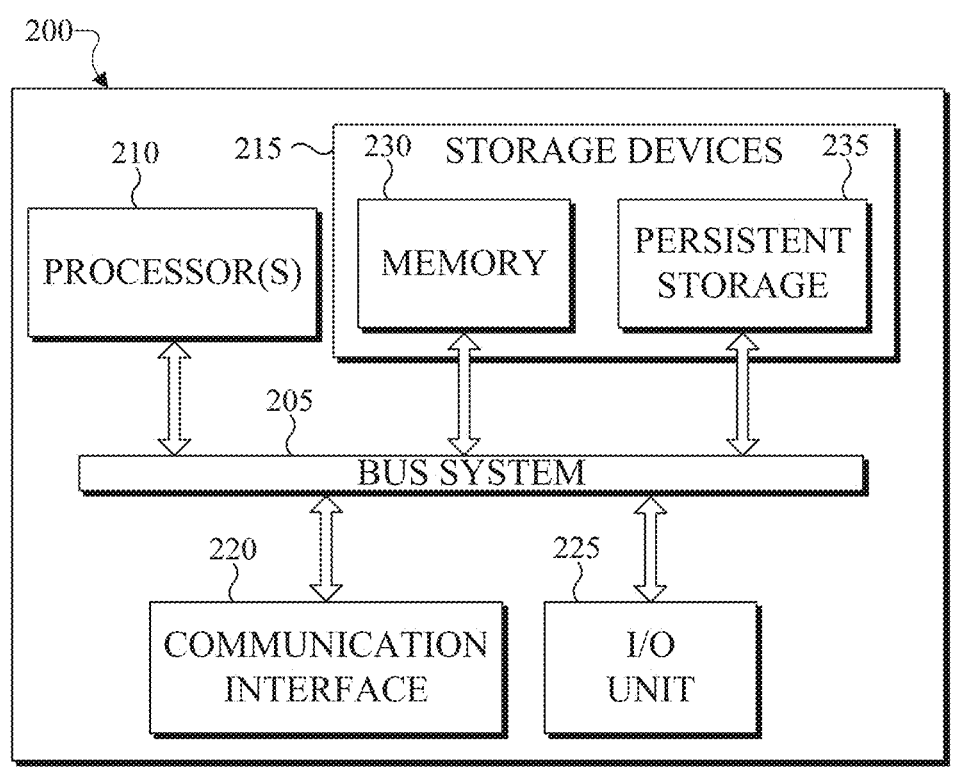
FIGS. 2 and 3 illustrate example electronic devices in accordance with an embodiment of this disclosure.
Figure 3:
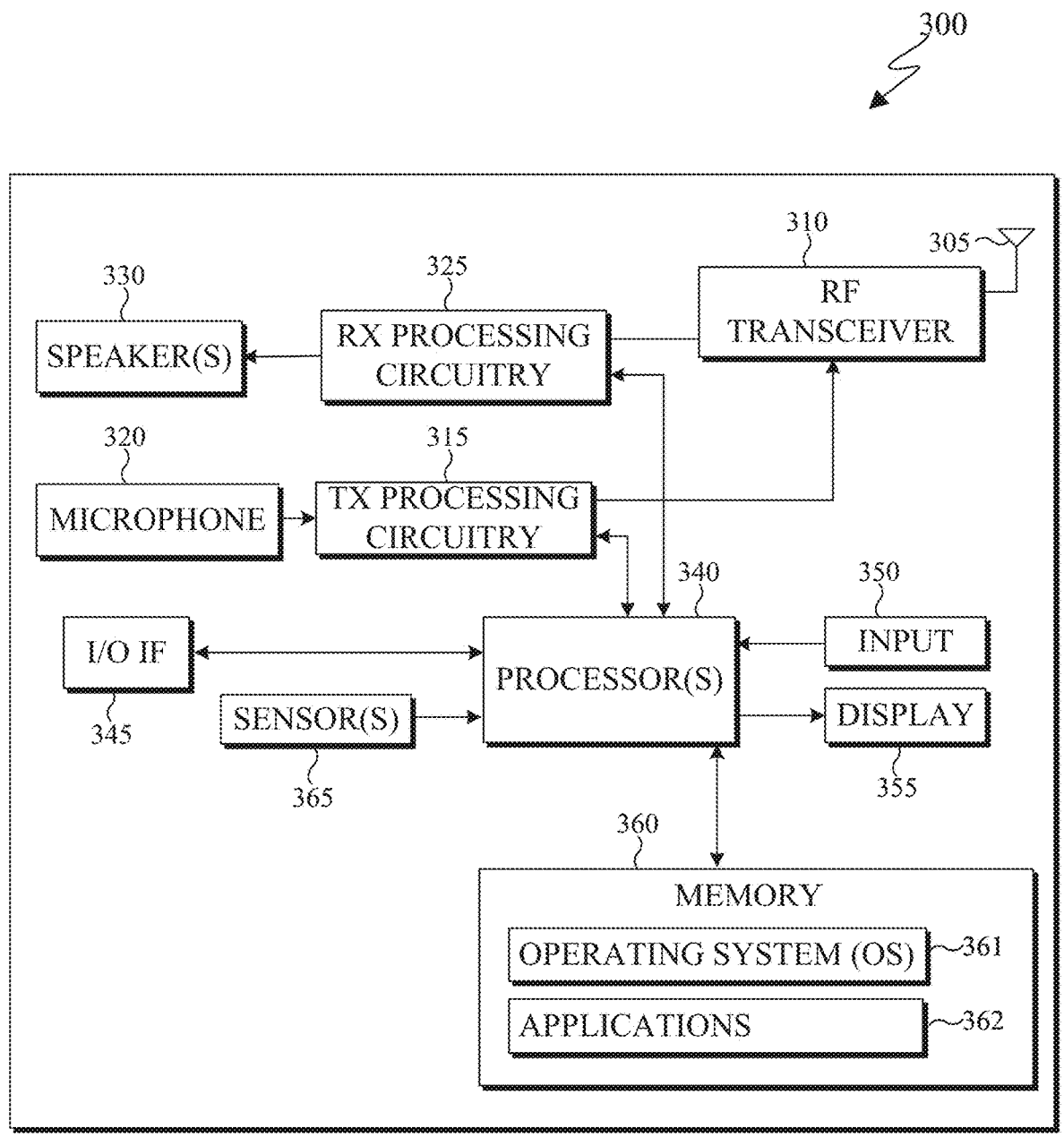

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 includes a bus system 205 that supports communication between at least one processing device (such as a processor 210), at least one storage device 215, at least one communications interface 220, and at least one input/output (I/O) unit 225. The server 200 can represent one or more local servers, one or more compression servers, or one or more encoding servers, such as an encoder. In certain embodiments, the encoder can perform decoding.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D pint cloud also decodes the 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for decomposing a point cloud into patches, instructions for packing the patches on two dimensional (2D) frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

The electronic device 300 can create media content such as generate a virtual object or capture (or record) content through a camera. To transmit the media content to another device, the electronic device 300 can compress and encode the content. When preparing the media content to be transmitted, the electronic device 300 can project the point cloud into multiple patches. For example, a cluster of points of the point cloud can be grouped together and depicted as a patch in a 2D frame. A patch can represent a single attribute of the point cloud, such as geometry, color, and the like. Patches that represent the same attribute can be packed into individual 2D frames, respectively.

The 2D frames are then encoded to generate a bitstream. The frames can be encoded individually or together. During the encoding process additional content such as metadata, flags, occupancy maps, auxiliary information, and the like can be included in the bitstream. The electronic device 300 can encode the media content to generate a bitstream, such that the bitstream can be transmitted directly to another electronic device or indirectly such as through the network 102 of FIG. 1. Another electronic device, similar to the electronic device 300, can receive a bitstream directly from the electronic device 300 or indirectly such as through the network 102 of FIG. 1.

Similarly, when decoding media content included in a bitstream that represents a 3D point cloud, the electronic device 300 decodes the received bitstream into frames. In certain embodiments, the decoded bitstream also includes an occupancy map. The decoded bitstream can also include one or more flags, or quantization parameter size, auxiliary information, or any combination thereof. A geometry frame can include pixels that indicate geographic coordinates of points of the point cloud in 3D space. Similarly, a color frame can include pixels that indicate the RGB color of each geometric point in 3D space. In certain embodiments, an individual frame can include points from different layers. In certain embodiments, after reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4A:
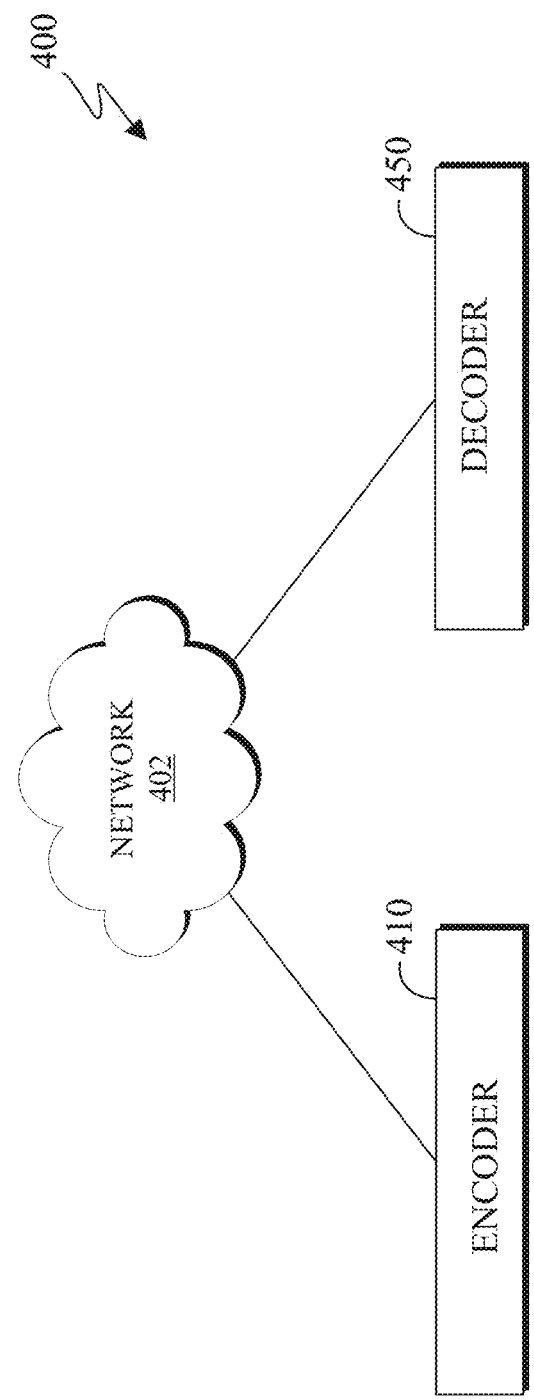
FIGS. 4A, 4B, and 4C illustrate block diagrams in accordance with an embodiment of this disclosure.
Figure 4B:
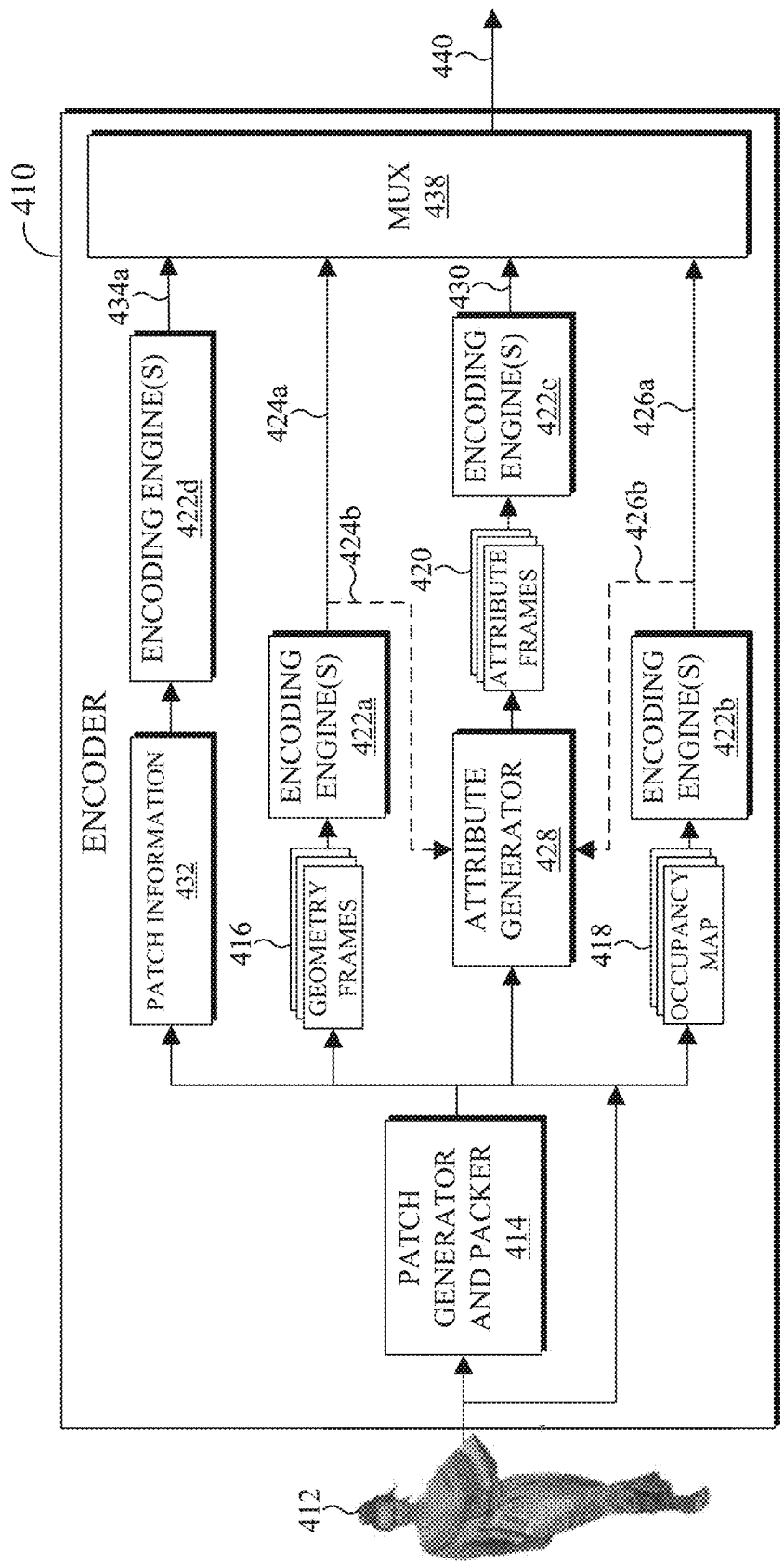
Figure 4C:
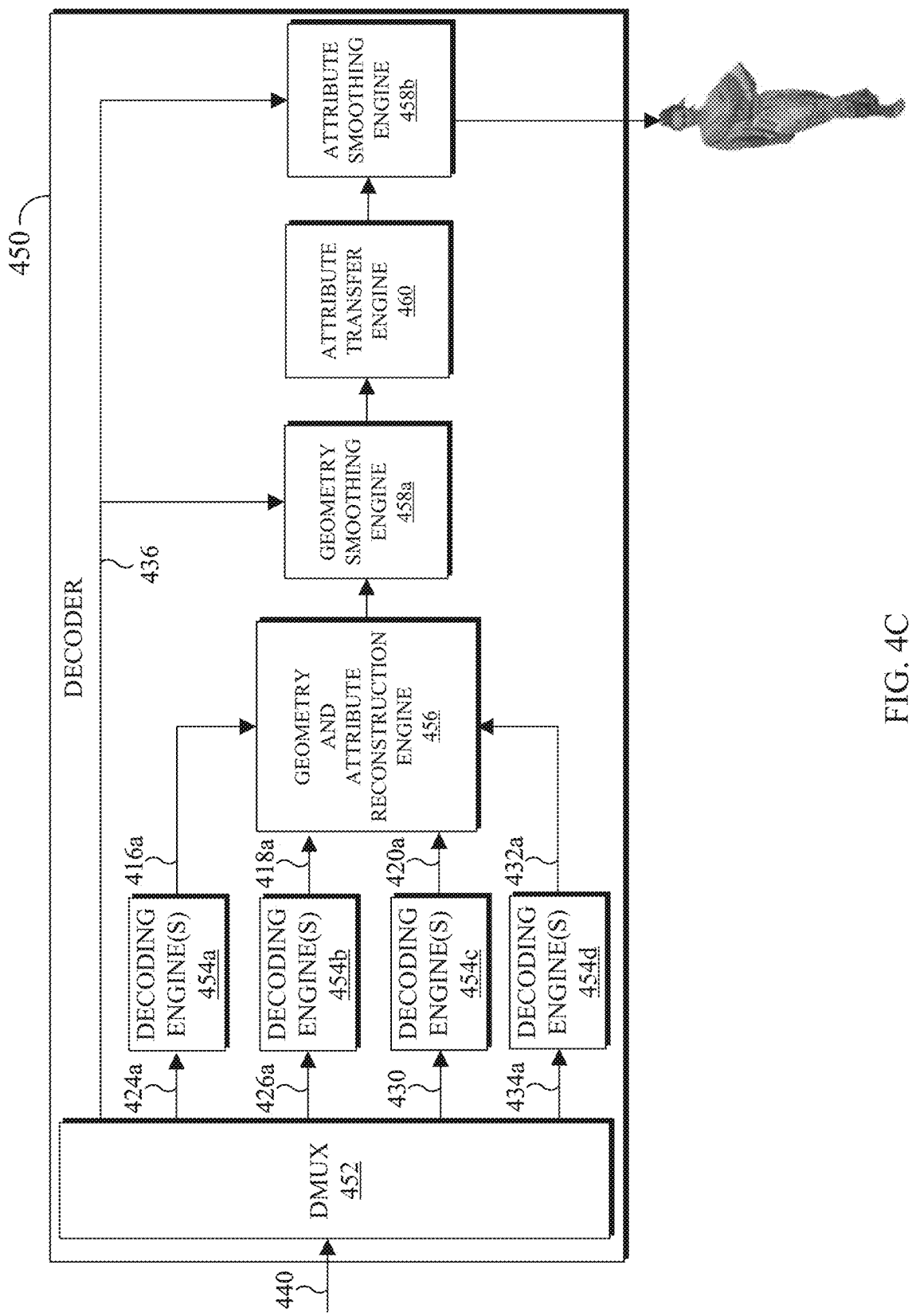

FIGS. 4A, 4B, and 4C illustrate block diagrams in accordance with an embodiment of this disclosure. In particular, FIG. 4A illustrates a block diagram of an example environment-architecture 400 in accordance with an embodiment of this disclosure. FIG. 4B illustrates an example block diagram of the encoder 410 of FIG. 4A and FIG. 4C illustrates an example block diagram of the decoder 450 of FIG. 4A in accordance with an embodiment of this disclosure. The embodiments of FIGS. 4A, 4B, and 4C are for illustration only. Other embodiments can be used without departing from the scope of this disclosure.

As shown in FIG. 4A, the example environment-architecture 400 includes an encoder 410 and a decoder 450 in communication over a network 402. The encoder 410 is described in greater detail in FIG. 4B, below. The decoder 450 is described in greater detail in FIG. 4C, below.

The network 402 can be the same as or similar to the network 102 of FIG. 1. In certain embodiments, the network 402 represents a "cloud" of computers interconnected by one or more networks, where the network is a computing system utilizing clustered computers and components that act as a single pool of seamless resources when accessed. Also, in certain embodiments, the network 402 is connected with one or more servers (such as the server 104 of FIG. 1, the server 200), one or more electronic devices (such as the client devices 106-116 of FIG. 1, the electronic device 300), the encoder 410, and the decoder 450. Further, in certain embodiments, the network 402 can be connected to an information repository that contains a VR and AR media content that can be encoded by the encoder 410, decoded by the decoder 450, or rendered and displayed on an electronic device.

In certain embodiments, the encoder 410 and the decoder 450 can represent the server 104, one of the client devices 106-116 of FIG. 1, the server 200 of FIG. 2, the electronic device 300 of FIG. 3, or another suitable device. In certain embodiments, the encoder 410 and the decoder 450 can be a "cloud" of computers interconnected by one or more networks, where each is a computing system utilizing clustered computers and components to act as a single pool of seamless resources when accessed through the network 402. In some embodiments, a portion of the components included in the encoder 410 or the decoder 450 can be included in different devices, such as multiple servers 104 or 200, multiple client devices 106-116, or other combination of different devices. In certain embodiments, the encoder 410 is operably connected to an electronic device or a server while the decoder 450 is operably connected to an electronic device. In certain embodiments, the encoder 410 and the decoder 450 are the same device or operably connected to the same device.

Generally, the encoder 410, as shown in FIGS. 4A and 4B, receives 3D media content, such as a point cloud, from another device such as a server (similar to the server 104 of FIG. 1, the server 200 of FIG. 2), an information repository (such as a database), or one of the client devices 106-116. In certain embodiments, the encoder 410 can receive media content from multiple cameras and stitch the content together to generate a 3D scene that includes one or more point clouds.

The encoder 410 segments points of the point cloud into multiple patches that represent the projection. A clusters of the points can represent a patch. The encoder 410 packs and stores information representing patches representing the point cloud onto a 2D frame. The 2D frames can be video frames. It is noted, a point of the 3D point cloud is located in 3D space based on a (X, Y, Z) coordinate value, but when the point is projected onto a 2D frame the pixel representing the projected point is denoted by the column and row index of the frame indicated by the coordinate (u, v). Additionally, 'u' and 'v' can range from zero to the number of rows or columns in the depth image, respectively.

Each of the 2D frames (such as the geometry frames 416 and the attribute frames 420) represents a particular aspect of the point cloud, such as one set of frames can represent geometry and another set of frames can represent an attribute (such as color). It should be noted that additional frames can be generated based on more layers as well as each additionally defined attribute.

The encoder 410 also generates an occupancy map frames 418 based on the geometry frames 416 to indicate which pixels within the frames are valid. Generally, the occupancy map indicates, for each pixel within a frame, whether the pixel is a valid pixel or an invalid pixel. For example, if a pixel in the occupancy map at coordinate (u, v) is valid, then the corresponding pixel in a geometry frame and the corresponding attribute frame at the coordinate (u, v) are also valid. If the pixel in the occupancy map at coordinate (u, v) is invalid, then the decoder skips the corresponding pixel in the geometry and attribute frames at the coordinate (u, v) for reconstruction purposes. An invalid pixel can include information such as padding that can increase the encoding efficiency but does not provide any information associated with the point cloud itself. Generally, the occupancy map is binary, such that the value of each pixel is either one or zero. For example, when the value of a pixel at position (u, v) of the occupancy map is one, indicates that a pixel at (u, v) of an attribute frame and the geometry frame is valid. In contrast, when the value of a pixel at position (u, v) of the occupancy map is zero indicates that a pixel at (u, v) of the attribute frame and the geometry frame is invalid, and therefore does not represent a point of the 3D point cloud. A non-binary occupancy map may be thresholded or processed to generate a binary occupancy map.

The encoder also generates patch information 432 that include information relating the pixels of the video frames to the point cloud. For example, the patch information 432 can indicate a 3D location of a patch that is stored in the video frames. The patch information 432 can also indicate where the patches are located on a 2D grid of a video frame. The patch information can also indicate the size of a patch (such as the number of pixels that correspond to a patch).

The encoder 410 transmits frames representing the point cloud as an encoded bitstream. The bitstream can be transmitted to an information repository (such as a database) or an electronic device that includes a decoder (such as the decoder 450) through the network 402. The encoder 410 is described in greater detail below in FIG. 4B.

As illustrated in FIG. 4B, the encoder 410 receives a 3D point cloud 412 and generates a bitstream 440. The bitstream 440 includes data representing a 3D point cloud 412. The bitstream 440 can include multiple bitstreams that are multiplexed together via a multiplexer 438. The bitstream 440 can be transmitted via the network 402 of FIG. 4A to another device, such as the decoder 450, an electronic device that includes the decoder 450, or an information repository. The encoder 410 also includes a patch generator and packer 414, one or more encoding engines (such as encoding engine 422a, 422b, 422c, and 422d which are collectively referred to as encoding engines 422), and an attribute generator 428.

The 3D point cloud 412 can be stored in memory 230, 360 or received from another electronic device. The 3D point cloud 412 can be a single 3D object (similar to the 3D point cloud 400 of FIG. 4A), or a grouping of 3D objects. The 3D point cloud 412 can be a stationary object or an object which moves.

The patch generator and packer 414 is used for generating geometry frames 416, occupancy map frames 418, attribute information (which is used by the attribute generator 428 to generate the attribute frames 420), and patch information 432 (which includes patch information providing information about the patches, such as an index number that is associated with each patch).

The patch generator 414 generates patches by taking projections of the 3D point cloud 412. In certain embodiments, the patch generator 414 splits the geometry information and attribute information of each point of the 3D point cloud 412. The patch generator 414 can use multiple projection planes (similar to the projection plane 410, 412, 414, 416, 418, and 420 of FIG. 4D), to cluster the points of the 3D point cloud 412 to generate the patches.

The patch generator 414 determines the best projection plane for each point. The patches are generated based on clustering points of the 3D point cloud that are associated with a particular projection plane corresponding to the normal vector of each point. Generating 2D patches that represent the 3D point cloud can consume over 80% of the total encoding runtime of the encoder 410 when generating the bitstream 440. For example, the process of estimating the normal vector for the points of the input point cloud 412, in order to identify a particular projection plane that corresponds to each point, consumes high processing power, especially for large point clouds with millions of points. Accordingly, embodiments of the present disclosure describe methods to reduce the complexity for estimating the normal vector for every single point of the input point cloud 412.

After determining the best projection plane for each point of the 3D point cloud 412 the patch generator and packer 414 segments the points into patch data structures that are packed frames, such as the geometry frames 416 and the geometry frame 430 of FIG. 4C. As illustrated in FIGS. 4C and 4D, discussed above, the patches are organized and placed within corresponding frames, such as the patch 432 is included in the geometry frame 430 and the patch 442 is included in the attribute frame 440. It is noted that patches representing different attributes of the same cluster of points include a correspondence or a mapping, such a pixel in one patch corresponds to the same pixel in another patch, based on the locations of the pixels being at the same position in the respective frames.

The occupancy map frames 418 represent occupancy maps that indicate the valid pixels in the frames (such as the geometry frames 416). For example, the occupancy map frames 418 indicate whether each pixel in the geometry frame 416 is a valid pixel or an invalid pixel. Each valid pixel in the occupancy map frames 418 corresponds to pixels in the geometry frames 416 that represents a position point of the 3D point cloud 412 in 3D space. In contrast, the invalid pixels are pixels within the occupancy map frames 418 that correspond to pixels in the geometry frames 416 that do not represent a point of the 3D point cloud 412 (such as the empty/black space in the frames 430 and 440 of FIGS. 4C and 4D). In certain embodiments, one of the occupancy map frames 418 can correspond to both a geometry frame 416 and an attribute frame 420 (discussed below).

For example, when the patch generator and packer 414 generates the occupancy map frames 418, the occupancy map frames 418 include predefined values for each pixel, such as zero or one. For example, when a pixel of the occupancy map at position (u, v) is a value of zero, indicates that the pixel at (u, v) in the geometry frame 416 is invalid. Similarly, when a pixel of the occupancy map at position (u, v) is a value of one, indicates that the pixel at (u, v) in the geometry frame 416 is valid and thereby includes information representing a point of the 3D point cloud.

The geometry frames 416 include pixels representing the geometry values of the 3D point cloud 412. The geometry frames 416 include the geographic information of points of the 3D point cloud 412. For example, the two transverse coordinates (with respect to the projection plane) of a 3D point corresponds to the column and row indices in the geometry video frame (u, v) plus a transverse-offset which indicates the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

In certain embodiments, the patch information 432 contain information about the patches. For example, the patch information 432 include positioning of the patches in the 2D frame, the offsets for the patch segment in the 3D point cloud space, the plane on which the patch is projected on, and the like. The patch information 432 can include information that relates the patches that are stored in the geometry frames 416 and occupancy map frames 418 to location on the 3D point cloud 412. The patch information can also indicate the size of a patch (such as the number of pixels that correspond to a patch).

The encoder 410 includes one or more encoding engines 422. In certain embodiments, the video frames (such as the geometry frames 416, the occupancy map frames 418, and the attribute frames 420) and the patch information 432 are encoded by independent encoding engines 422, as illustrated. In other embodiments, a single encoding engine performs the encoding of the frames.

The encoding engines 422 can be configured to support an 8-bit, a 10-bit, a 12-bit, a 14-bit, or a 16-bit, precision of data. The encoding engines 422 can include a video or image codec such as HEVC, AVC, VP9, VP8, VVC, EVC, AV1 and the like to compress the 2D frames representing the 3D point cloud. The one or more of the encoding engines 422 can compress the information in a lossy or lossless manner.

As illustrated, the encoding engine 422a receives geometry frames 416 and performs geometry compression to generate a geometry sub-bitstream 424a. The encoding engine 422b receives occupancy map frames 418 and performs occupancy map compression to generate an occupancy map sub-bitstream 426a. The encoding engine 422c receives attribute frames 420 and performs attribute compression to generate an attribute sub-bitstream 430. The encoding engine 422d receives patch information 432 and performs compression to generate a patch information sub-bitstream 434a. In certain embodiments, the patch information is not compressed.

In certain embodiments, the encoding engines 422 can subsample the video frames (such as the geometry frames 416, the occupancy map frames 418, and the attribute frames 420) and the patch information 432 differently. For example, the patch information 432 can be sized 1024×1024, the geometry frames 416 can be sized 412×412, the occupancy map frames 418 can be sized 256×256, and the attribute frames 420 can be sized 128×128. The sizes in this example are for explanation only and other sizes for the frames can be used. Additionally, some of the frames can be subsampled to the same size.

After the encoding engine 422a generates the geometry sub-bitstream 424a, a decoding engine can decode the geometry sub-bitstream 424a to generate the reconstructed geometry frames 424b. Similarly, after the encoding engine 422b generates the occupancy map sub-bitstream 426a, a decoding engine can decode the occupancy map sub-bitstream 426a to generate the reconstructed occupancy map frames 426b.

The attribute generator 428 generates the attribute frames 420 based on the attribute information from the 3D point cloud 412 provided by the patch generator and packer 414, the reconstructed geometry frames 424b, the reconstructed occupancy map frames 426b.

In certain embodiments, to generate one of the attribute frames 420 that represent color, the geometry frames 416 are compressed by the encoding engine 422a using a 2D video codec such as HEVC. The geometry sub-bitstream 424a is decoded to generate the reconstructed geometry frames 424b. Similarly, the occupancy map frame 418 is compressed using the encoding engine 422b and then decompressed to generate the reconstructed occupancy map frames 426b. The encoder 410 can then reconstruct the geometric locations of the points of the 3D point cloud based on the reconstructed geometry frames 424b and the reconstructed occupancy map frames 426b. The attribute generator 428 interpolates the attribute values (such as color) of each point from the color values of input point cloud to the reconstructed point cloud and the original point cloud 412. The interpolated colors are then segmented, by the attribute generator 428, to match the same patches as the geometry information. The attribute generator 428 then packs interpolated attribute values into an attribute frame 420 representing color. In other embodiments, the attribute generator can perform other methods for generating the attribute frames.

The attribute frames 420 represents one or more different attributes of the point cloud. For example, for one of the geometry frames 416 there can be zero or more corresponding attribute frames 420. The attribute frame can represent attributes such as color, texture, normal, material properties, reflection, motion, and the like. In certain embodiments, one of the attribute frames 420 can include color values for each of the geometry points within one of the geometry frames 416, while another attribute frame can include reflectance values which indicate the level of reflectance of each corresponding geometry point within the same geometry frame 416. Each additional attribute frame 420 represents other attributes associated with a particular geometry frame 416. In certain embodiments, each geometry frame 416 has at least one corresponding attribute frame 420.

In certain embodiments, the video frames (such as the geometry frames 416, the occupancy map frames 418, and the attribute frames 420) and the patch information can be the same size. In other embodiments, the video frames and the patch information can be different sizes.

The patch information 432, in addition to the elements described above, can include one or more flags, one or more additional syntax elements, one or more quantization parameter size, one or more thresholds, or any combination thereof.

In certain embodiments, a geometry smoothing engine can smooth the geometry frames 416, or the reconstructed geometry frames 424b and generate geometry smoothing parameters. Similarly, an attribute smoothing engine can smooth the attribute frames 416520 and generate attribute smoothing parameters. The smoothing parameters can be utilized by the decoder 450 for improving the visual quality of the reconstructed point cloud.

The multiplexer 438 combines the patch information sub-bitstream 434a, the geometry sub-bitstream 424a, the occupancy map sub-bitstream 426a, the attribute sub-bitstream 430, and any smoothing parameters (such as the geometry smoothing parameters and the attribute smoothing parameters), to create the bitstream 440.

Generally, the decoder 450 of FIGS. 4A and 4C, receives a bitstream (such as the bitstream 440) that represents media content, such as a point cloud. The bitstream 440 can include data representing a 3D point cloud. In certain embodiments, the decoder 450 can decode the bitstream 440 and generate multiple frames such as one or more geometry frames, one or more attribute frames, and one or more occupancy map frames. The decoder 450 reconstructs the point cloud or a portion of the point cloud using the multiple frames, which can be rendered and viewed by a user.

As illustrated in FIG. 4C, the decoder 450 that includes a demultiplexer 452, one or more decoding engines (such as a decoding engine 454a, a decoding engine 454b, a decoding engine 454c, and a decoding engine 454d), a geometry and attribute reconstruction engine 456, smoothing engines (such as a geometry smoothing engine 458a and an attribute smoothing 458b), and an attribute transfer engine 460.

The decoder 450 receives a bitstream 440, such as the bitstream that was generated by the encoder 410. The demultiplexer 452 separates bitstream 440 into one or more sub-bitstreams representing the different information. For example, the demultiplexer 452 separates various streams of data such into the individual sub-bitstreams such as the parameters sets and messages 436b (which can include the syntax element, geometry smoothing parameters, and attribute smoothing parameters), the geometry sub-bitstream 424a, the occupancy map sub-bitstream 426a, the attribute sub-bitstream 430, and the patch information sub-bitstream 434b. In certain embodiments, the geometry smoothing parameters and the attribute smoothing parameters are not included in the bitstream if the encoder 410 did not perform smoothing.

The decoder 450 includes one or more decoding engines. For example, the decoder 450 can include the decoding engine 454a, a decoding engine 454b, a decoding engine 454c, and a decoding engine 454d (collectively referred to as the decoding engines 454). In certain embodiments, a single decoding engine performs the operations of all of the individual decoding engines 454.

In certain embodiments, the parameter sets and messages 436 provides smoothing parameters from any smoothing engine of the encoder 410. For example, the parameter sets and messages 436 provides geometry smoothing parameters to the geometry smoothing engine 458*a*. Similarly, the parameter sets and messages 436 provides attribute smoothing parameters to the attribute smoothing engine 458*b*.

The decoding engine 454*a* decodes the geometry sub-bitstream 424*a* into reconstructed geometry 416*a*. Similarly, the decoding engine 454*b* decodes the occupancy map sub-bitstream 426*a* into reconstructed occupancy map frames 418*a*. Additionally, the decoding engine 454*c* decodes the attribute sub-bitstream 430 into reconstructed attribute 420*a*. The decoding engine 454*d* decodes the patch information sub-bitstream 434*a* into reconstructed patch information 432*a*. In certain embodiments, if the patch information 432 of FIG. 4B was not encoded, then demultiplexer 452 separates the patch information 432 from the bitstream (instead of the patch information sub-bitstream 434*a*) and the patch information 432 are not decoded by the decoding engine 454*d*.

After a portion of the reconstructed geometry 416*a*, and a portion of the reconstructed occupancy map frames 418*a*, a portion of the reconstructed attribute 420*a*, and a portion of the reconstructed patch information 432*a*, are decoded, the geometry and attribute reconstruction engine 456 generates a reconstructed point cloud. As discussed above, the portion of the decoded frames can be the entirety of the frames or less. In certain embodiments, the parameter sets and messages 436*b* can provide various flags, syntax elements, messages, and the like to the geometry and attribute reconstruction engine 456 for reconstructs the points of the point cloud in 3D space. The geometry and attribute reconstruction engine 456 reconstructs the points of the point cloud in 3D space, based on the reconstructed occupancy map frames 418*a*, the reconstructed geometry 416*a*, the reconstructed attribute 420*a*, the reconstructed patch information 432*a* and any received information from the parameter sets and messages 436*b*.

The geometry smoothing engine 458*a* can be enabled or disabled. If the geometry smoothing engine 458*a* is enabled, then the geometry smoothing engine 458*a* performs smoothing to the geometry points of the reconstructed point cloud. The geometry smoothing engine 458*a* can use a geometry smoothing parameter provided by the parameter sets and messages 436*b*. If the geometry smoothing engine 458*a* is disabled, then the decoder 450 does not perform geometry smoothing.

In certain embodiments, the decoder 450, via the attribute transfer engine 460, performs attribute transfer step. The attribute transfer engine 460 modifies the attribute information to match the locations of the points in 3D space.

The attribute smoothing engine 458*b* can be enabled or disabled. If the attribute smoothing engine 458*b* is enabled, then the attribute smoothing engine 458*b* performs smoothing to the attribute points of the reconstructed point cloud. The attribute smoothing engine 458*b* can use an attribute smoothing parameter provided by the parameter sets and messages 436*b*. In this case, if attribute smoothing is enabled, the attribute smoothing engine 458*b* smooths the reconstructed attributes based on one or more attribute smoothing parameter. Thereafter the decoder reconstructs the point cloud 462 for rendering. If attribute smoothing is disabled (the decoder 450 can skip the attribute smoothing engine 458*b*), the reconstructed attributes are directly used to reconstruct point cloud 462 for rendering.

Although FIG. 4A illustrate the environment-architecture 400, FIG. 4B illustrates the encoder 410, and FIG. 4C illustrates the decoder 450, various changes can be made to FIGS. 4A, 4B, and 4C. For example, any number of encoders or decoders can be included environment-architecture 400.

Figure 5:
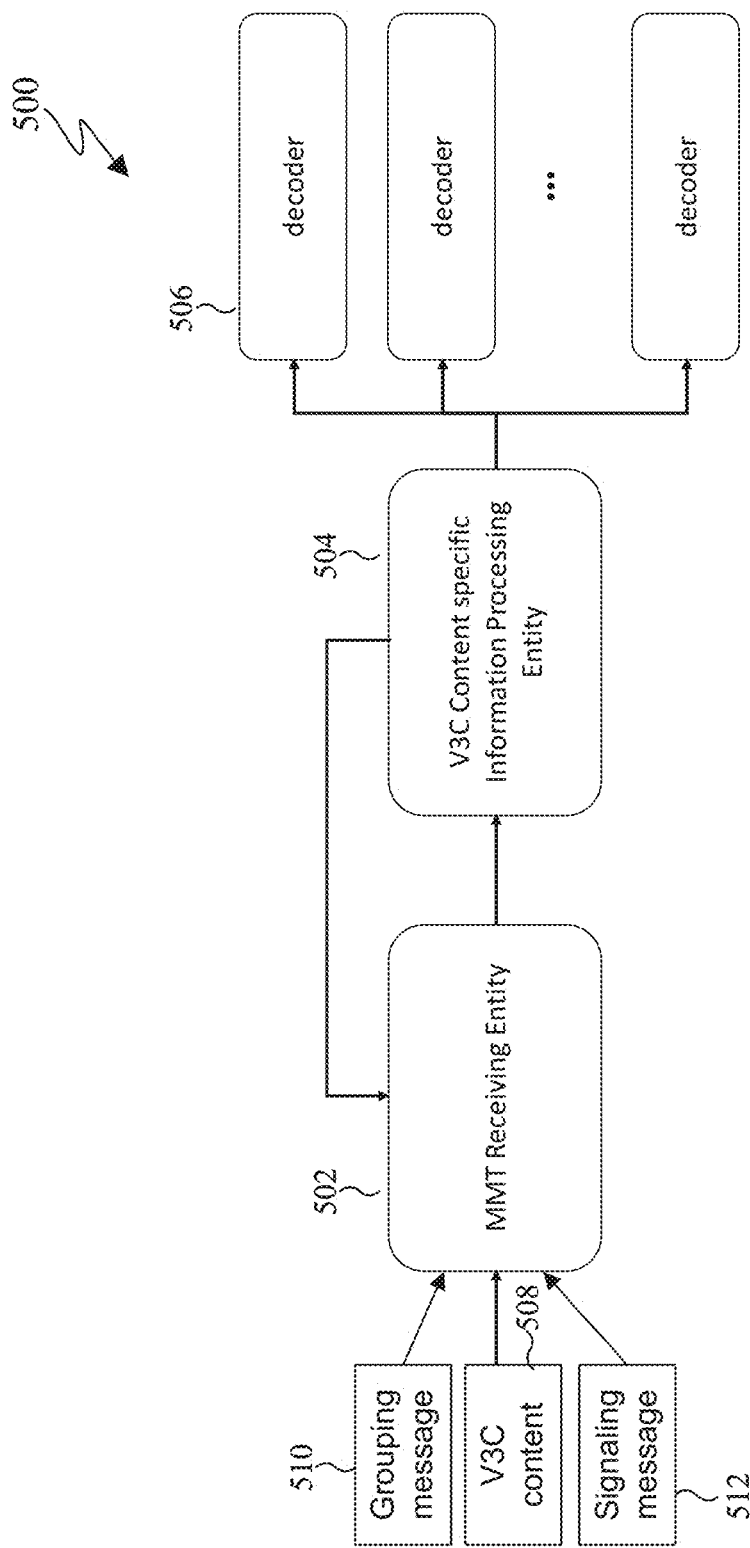
FIG. 5 illustrates an example architecture of V3C content signaling in accordance with an embodiment of this disclosure.

FIG. 5 illustrates an example architecture 500 of V3C content signaling in accordance with an embodiment of this disclosure. The embodiment of the architecture 500 illustrated in FIG. 5 is for illustration only. FIG. 5 does not limit the scope of this disclosure to any particular implementation of an electronic device.

As shown in FIG. 5, the architecture 500 includes an MMT receiving entity 502, a V3C processing entity 504, and one or more decoders 506. Two types of signaling is provided for a V3C content 508, a grouping message 510 and a V3C signaling message 512. The grouping message 510 includes signaling information provided per MMT Package or MMT assets by using the general MMT signaling messages, tables and descriptors agnostic to specific content types or media types. Such information is used by the MMT receiving entity 502 to understand the structure of MMT packages or the properties of MMT assets. The V3C signaling message is the signaling information specific to V3C content types which provides structure of each V3C contents and properties specific to a V3C content or the components of the V3C content. General MMT signaling information is processed by the MMT receiving entity 502 and the V3C content type specific information is processed by the V3C content specific information processing entity 504. In some cases, feedback is provided from the V3C content specific information processing entity 504 to the MMT receiving entity 502 according to the V3C content type specific signaling information.

A characteristic of V3C content 508 is that a content is composed of multiple bitstream (e.g. V3C Atlas bitstream and V3C video component bitstreams) to be decoded by individual decoders 506. So, each bitstreams comprising a V3C content 508 needs to be considered as an individual asset.

In addition, the information logically grouping multiple assets together as one content is required. As such information does not exist in the MMT specification, new signaling information needs to be defined. In ISOBMFF files carrying V3C contents 508, the grouping of individual tracks to logically group them as on content is signaled by the track reference information using TrackReferenceBox field carried in the track referencing other tracks. Therefore, signaling information using the same referencing information seems appropriate. In MMT, the information about each individual assets is carried as the descriptors and such descriptors are carried in the asset descriptor loop of a signaling messages or signaling tables such as an MP Table in a PA message. The grouping 510 or asset reference descriptor for MMT assets provides information for logically grouping the assets into a single content by using the track reference information used by ISOBMFF.

The grouping message 510 asset reference descriptor provides the reference relationship information among the assets. This descriptor can be added to the asset descriptor loop of the signalling messages or signalling tables (e.g., MP table) of an asset referencing other assets. Table 1 shows the syntax of the Asset Reference Descriptor.

TABLE 1

Asset Reference Descriptor

| Syntax | Values | No. of bits | Mnemonic |
|---|---|---|---|
| Asset_Reference_Descriptor ( ){ | | | |
|   descriptor_tag | | 16 | uimsbf |
|   descriptor_length | | 8 | uimsbf |
|   group_identification | | 8 | uimsbf |
|   number_of_reference | N | 8 | uimsbf |
|   for(i=0 ; N ; i++){ | | | |
|     reference_type | | 32 | char |
|     asset_id( ) | | | |
|   } | | | |
| } | | | |

Where the group_identification field represents a field that specifies a group identification to identify a group of assets in reference relationship. The number_of_reference field represents a field that specifies a number of referenced assets by the asset associated with this descriptor. The reference_type field represents a field that specifies a type of reference, which is described in four character code ("4CC") type registered in MP4RA. The asset_id field provides an identifier of the asset referenced by the asset associated with this descriptor.

For V3C content 508, asset reference descriptors are carried in the asset descriptor loop of signaling messages or signaling tables of an MMT Asset for the V3C atlas bitstream. The asset reference descriptor or grouping message 510 includes track references information to the assets carrying other bitstream comprising a V3C content 508 such as other V3C Atlas bitstreams, V3C Atlas tile bitstreams or V3C video component bitstreams. Each referencing information is composed of the track reference type and the ID of an asset referenced with such track reference type. When the V3C Atlas tile is used, the asset descriptor loop of the asset carrying V3C Atlas bitstream includes asset reference descriptor providing references to the assets carrying the V3C Atlas tile bitstream and the asset descriptor loop of each assets carrying V3C Atlas tile bitstream carries the asset reference descriptor providing references to the assets carrying V3C video component bitstream. When a V3C content 508 has multiple V3C Atlases, then an asset descriptor loop of the asset carrying common information applicable to all V3C Atlases carries the asset reference descriptor to the assets carrying V3C Atlas bitstreams.

The V3C asset grouping message 510 or signaling message 512 provides information about the structure of a V3C content 508 by referencing asset descriptors provided in the signaling messages carrying general information of the assets, such as MP Table. As a V3C content 508 can be composed of various assets with multiple nested referencing relationship, the message may include the list of identifiers of all asset reference descriptors related to a single V3C content 508. If the V3C content 508 provide partial access information then the information about the 3D spatial regions covered by a V3C atlas bitstream or a V3C atlas tile bitstream and the V3C video components referenced by them with asset reference descriptor is provided by using 3D Spatial Region Struct. If the V3C content 508 or the V3C video components of it has an alternative, then the identifier of the asset group descriptor is provided for each asset that has one or more alternatives.

| Syntax | Values | No. of bits | Mnemonic |
|---|---|---|---|
| V3C_asset_group_message ( ) { | | | |
|   message_id | | 16 | uimsbf |
|   version | | 8 | uimsbf |
|   length | | 16 | uimsbf |
|   num_v3c_asset_groups | N1 | 8 | |
|   for (i=0; i<N1; i++) { | | | |
|     v3c_asset_group_id | | 8 | uimsbf |
|     num_assets | N2 | 8 | uimsbf |
|     3D_spatial_region_info_flag | | 1 | bslbf |
|     reserved | '1111111' | 7 | bslbf |
|     if (3D_spatial_region_info_flag){ | | | |
|       num_regions | | 16 | uimsbf |
|     3DSpatialRegionStruct(1) | | | |
|     } | | | |
|     for (j=0; i<N2; j++) { | | | |
|       asset_id( ) | | | |
|       alternate_group_info_flag | | 1 | bslbf |
|       reserved | | 7 | bslbf |
|       if (alternate_group_info_flag) | '1111111' | | |
|         alternate_group_id | | 8 | uimsbf |
|       } | | | |
|     } | | | |
|   } | | | |
| } | | | |

Where the v3c_asset_group_id field represents a field that carries the value of the group identification field of the Asset_Reference_Descriptor carried in the asset descriptor loop of the Asset for the V3C Atlas bitstream or V3C Atlas tile bitstream. The 3D_spatial_region_info_flag field represents a field that indicates whether 3D spatial region information is carried by the asset, where a value of 0 indicates the 3D sptial region information is not provided and a value of 1 indicates the 3D sptial region information is provided. The num_regions field represents a field that indicates a number of 3D spatial region information. The 3DSpatialRegionStruct structure represents a data structure that carries the information of the 3D spatial regions covered by the asset group. The num_assets field represents a field that indicate the number of assets whose asset specific information is provided in this signaling message. The alternate_group_if_flag field represents a field that indicates whether alternate group information is carried or not, where a value of 0 indicates the alternate group information is not provided and a value of 1 indicates the alternate group information is provided. The alternate_group_id field represents a field that carries a value of the group identification field of the Asset_Group_Descriptor associated with the Aasset.

Alternatively, the V3C asset group or signaling message 512 provides information about the structure of a V3C content 508 by referencing asset descriptors provided in the signaling messages carrying general information of the assets, such as an MP Table. As a V3C content 508 can be composed of various assets with multiple nested referencing relationship, the signaling message 512 may include a list of identifiers of all asset reference descriptors related to a single V3C content 508. If the V3C content 508 provide partial access information then the information about the 3D spatial regions covered by a V3C atlas bitstream or a V3C atlas tile bitstream and the V3C video components referenced by them with asset reference descriptor is provided by using 3D Spatial Region Struct. If the V3C content or the V3C video components of it has an alternative then the identifier of the asset group descriptor is provided for each asset which has alternatives.

| Syntax | Values | No. of bits | Mnemonic |
|---|---|---|---|
| AV3C_asset_group_message ( ) { | | | |
|   message_id | | 16 | uimsbf |
|   version | | 8 | uimsbf |
|   length | | 16 | uimsbf |
|   num_v3c_asset_groups | N1 | 8 | |
|   for (i=0; i<N1; i++) { | | | |
|     num_assets | | 8 | uimsbf |
|     3D_spatial_region_info_flag | N2 | 8 | uimsbf |
|     reserved | | 1 | bslbf |
|     if (3D_spatial_region_info_flag){ | '1111111' | 77 | bslbf |
|       num_regions | | | |
|       3DSpatialRegionStruct(1) | | 16 | uimsbf |
|     } | | | |
|   } | | | |
|   for (j=0; i<N2; j++) { | | | |
|     asset_id( ) | | | |
|     asset_reference_info_flag | | 1 | bslbf |
|     alternate_group_info_flag | | 1 | bslbf |
|     reserved | 1 | 6 | bslbf |
|     if(asset_reference_info_flag){ | '1111111' | 8 | uimsbf |
|       number_of_reference | | 8 | |
|       for(i=0 ; N3 ; i++){ | N3 | | |
|         reference_type | | 32 | char |
|         asset_id( ) | | | |
|       } | | | |
|     } | | | |
|     if (alternate_group_info_flag) | | | |
|       alternate_group_id | | 8 | uimsbf |
|   } | | | |
| } | | | |

Where the num_v3c_asset_groups field represents a field that indicates a number of asset groups indicated by the signaling message 512. The num_assets field represents a field that indicates a number of assets whose asset specific information is provided in the signaling message 512. The 3D_spatial_region_info_flag field represents a field that indicates whether 3D spatial region information is carried or not, where a value of 0 indicates the 3D sptial region information is not provided and a value of 1 indicates the 3D sptial region information is provided. The num_regions field represents a field that indicates a number of 3D spatial region information. The 3DSpatialRegionStruct (1) structure represents a data structure that carries the information of the 3D spatial regions covered by the asset group. The asset_reference_info_flag field represents a field that indicates whether asset reference information is provide or not. The number_of_reference field represents a field that specifies a number of referenced assets by the asset associated with this descriptor. The reference_type field represents a field that specifies a type of reference, which can be described in four character code ("4CC") type registered in MP4RA. The alternate_group_info_flag field represents a field that indicates whether alternate group information is carried or not, where a value of 0 indicates the alternate group information is not provided and a value of 1 indicates the alternate group information is provided. The alternate_group_id field represents a field that carries the value of the group identification field of the Asset_Group_Descriptor associated with the asset.

Although FIG. 5 illustrates an architecture 500 of V3C content signaling, various changes may be made to FIG. 5. For example, the sizes, shapes, and dimensions of the architecture 500 and its individual components can vary as needed or desired. Also, the number and placement of various components of the architecture 500 can vary as needed or desired. In addition, the architecture 500 may be used in any other suitable V3C content signaling process and is not limited to the specific processes described above.

Figure 6:
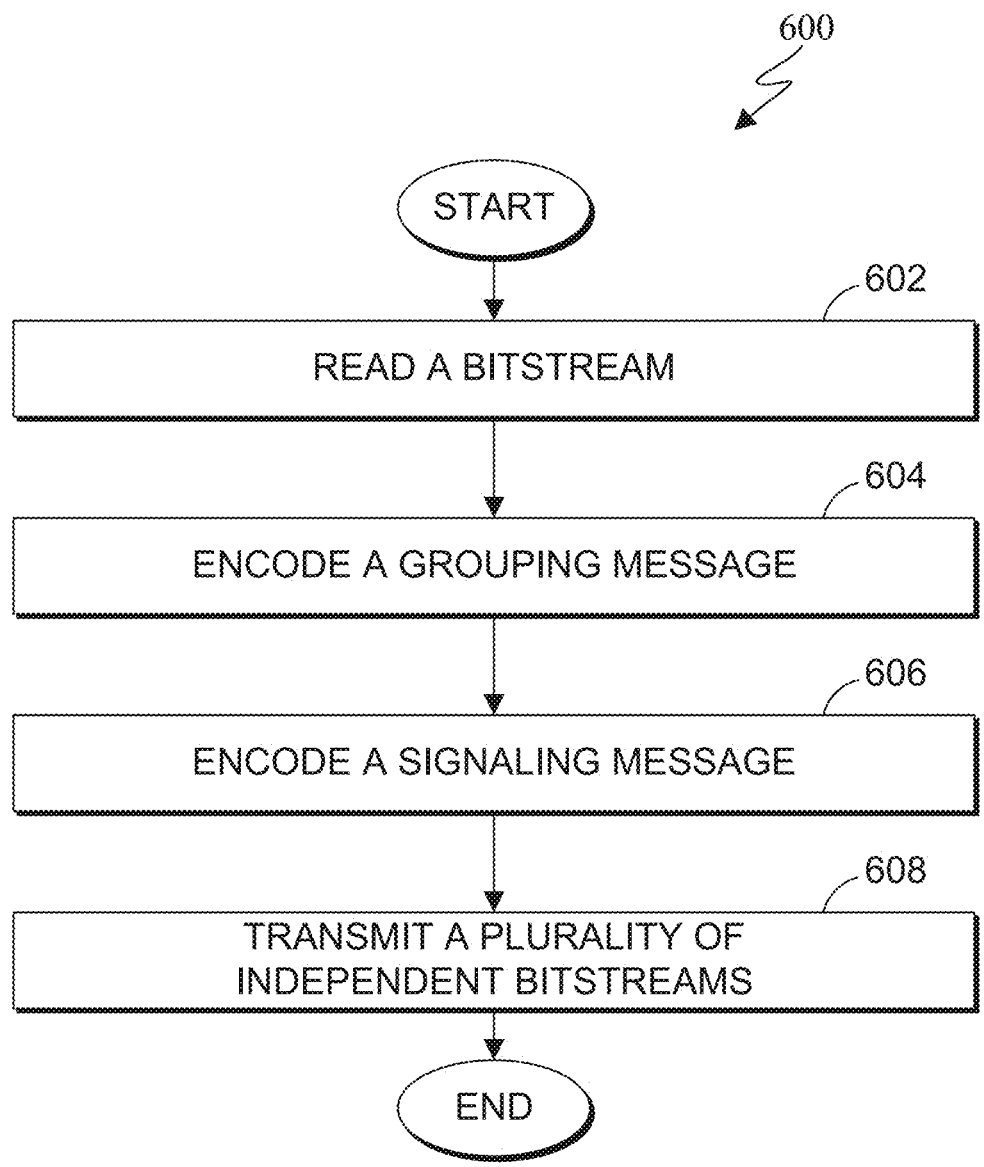
FIG. 6 illustrates an example method of a point cloud encoder for MMT signaling of V3C content according to this disclosure.

FIG. 6 illustrates an example method of a point cloud encoder for MMT signaling of V3C content according to this disclosure. The method 600 can be performed by the server 104 or any of the client devices 106-116 of FIG. 1, the server 200 of FIG. 2, the electronic device 300 of FIG. 3, the encoder 410 of FIG. 4A, or any other suitable device or system. For ease of explanation, the method 600 is described as being performed by the encoder 410 of FIG. 4A.

As shown in FIG. 6, the encoder 410 reads a bitstream at step 602. The bitstream can include a series of images or one or more videos. The bitstream can be read from a storage device 215, such as a memory 230 or persistent storage 235. The bitstream can be stored and received from an external source, such as an external server 104. The encoder 410 can receive a request from the decoder 450 to request and identify a specific portion from a plurality of independent bitstreams. The bitstream can include V3C content 508.

The encoder 410 can encode a grouping message 510 indicating a group of assets for a plurality of independent bitstreams containing V3C content 508 at step 604. The grouping message 510 is a descriptor indicating a reference relationship between assets in an asset group. The encoder 410 can encode a group identifier and/or group message 510 for the assets in the V3C content 508. The assets included in the V3C content 508 can be encoded based on asset identifiers included in the asset reference descriptor. The V3C content 508 can be encoded using the group identifier in the asset reference descriptor. In certain embodiments, the grouping message 510 can include an asset reference descriptor that provides reference relationship information among the assets.

The encoder 410 can encode a signaling message 512 indicating a portion of the bitstream in each asset of the asset group and a corresponding region to be occupied by the portion of the bitstream at step 606. The encoder 410 can encode a number of 3D spatial region information included in the signaling message 512 and information of 3D spatial regions covered by an asset. The encoder 410 can encode an alternative group of bitstreams for the asset indicated by the signaling message 512.

The encoder 410 transmits the compressed video bitstream at step 608. The compressed video bitstream including the specific portion is transmitted to a decoder 450. The encoder 410 also transmits the grouping message 510 and the signaling message 512 to the decoder 450. The encoder 410 can also transmit the one or more independent video bitstreams with the V3C content 508 to a server 104 for storing and distributing a one or more independent video bitstreams.

Although FIG. 6 illustrates one example of a method 600 for of a point cloud encoder for MMT signaling of V3C content, various changes may be made to FIG. 6. For example, while shown as a series of steps, various steps in FIG. 6 may overlap, occur in parallel, or occur any number of times.

Figure 7:
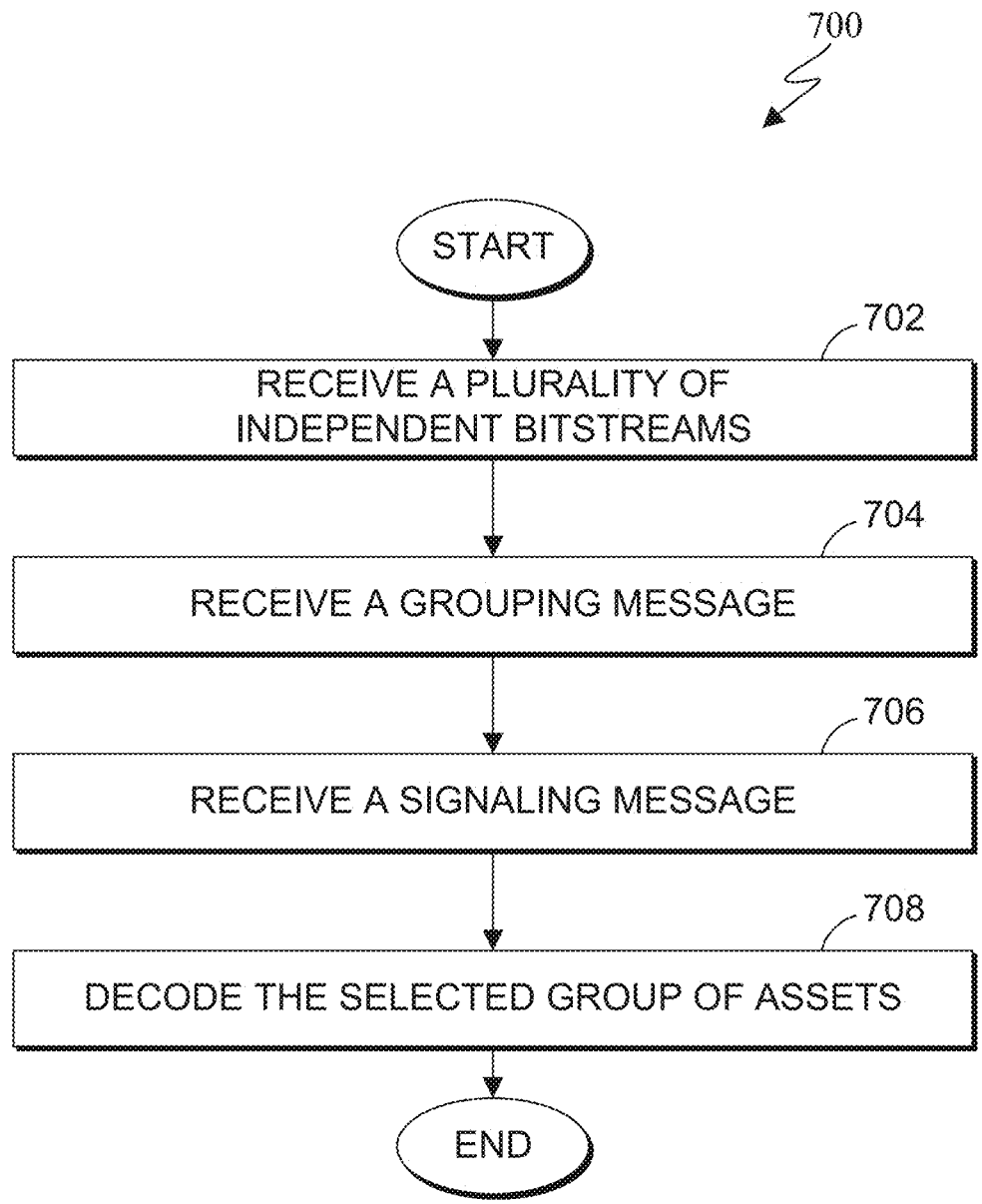
FIG. 7 illustrates an example method of a point cloud decoder for MMT signaling of V3C content according to this disclosure.

FIG. 7 illustrates an example method of a point cloud decoder for MMT signaling of V3C content according to this disclosure. The method 700 can be performed by the server 104 or any of the client devices 106-116 of FIG. 1, the server 200 of FIG. 2, the electronic device 300 of FIG. 3, the decoder 450 of FIG. 4A, or any other suitable device or system. For ease of explanation, the method 700 is described as being performed by the decoder 450 of FIG. 4A.

As shown in FIG. 7, the decoder 450 receives a plurality video bitstream at step 702. The compressed video bitstream can be received from an encoder, such as encoder 410 shown in FIG. 4. The compressed video bitstream can include a plurality of independent bitstreams of V3C content 508.

The decoder 450 can receive a grouping message 510 indicating a group of assets from the plurality of independent bitstreams containing V3C content 508 at step 704. The grouping message 510 is a descriptor indicating the reference relationship between the assets in the asset group. The decoder 450 can identify a group identifier for the assets in the V3C content 508. The assets included in the V3C content 508 can be identified based on asset identifiers included in the asset reference descriptor. The V3C content 508 can be identified using the group identifier in the asset reference descriptor. In certain embodiments, the grouping message 510 can include an asset reference descriptor that provides reference relationship information among the assets. The group of assets can be selected by the decoder 450 based on grouping message.

The decoder 450 can receive a signaling message 512 indicating a portion of the bitstream in each asset of the group and a corresponding region to be occupied by the portion of the bitstream at step 706. The decoder 450 can identify a number of 3D spatial region information included in the signaling message 512 and information of 3D spatial regions covered by an asset. The decoder 450 can identify an alternative group of bitstreams for the asset indicated by the signaling message 512. In certain embodiments, the signaling message 512 can include a V3C asset group message and/or an alternative asset group message.

The decoder 450 can decode at least the selected group of assets at step 710. The decoder 450 can decode the compressed video bitstream based on the grouping message 510 and the signaling message 512 for each of the independent streams. The video frames of the compressed video bitstream are decoded based on the asset of the V3C content 508. The decoded video bitstream can be stored or displayed on the decoder 450.

Although FIG. 7 illustrates one example of a method 700 of a point cloud decoder for MMT signaling of V3C content, various changes may be made to FIG. 7. For example, while shown as a series of steps, various steps in FIG. 7 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A point cloud decoding device comprising:
a communication interface configured to:
receive a plurality of independent bitstreams containing visual volumetric coding (V3C) content, and
receive a grouping message indicating a group of assets from the plurality of independent bitstreams containing the V3C content, wherein the grouping message is a descriptor indicating a reference relationship between the assets in the group; and
a processor operably coupled to the communication interface, the processor configured to:
select, based on the grouping message, the group of assets,
identify a group identifier in the grouping message for the selected group of assets in the V3C content,
identify reference relationship information in the grouping message for each asset in the group of assets included in the V3C content based on an asset identifier for each asset in the group of assets included in an asset reference descriptor with the group identifier, and
decode at least the identified group of assets.

2. The decoding device of claim 1, wherein the processor is further configured to:
identify information related to a number of assets in the group of assets.

3. The decoding device of claim 1, wherein the processor is further configured to:
identify information indicating alternative assets in the grouping message; and
decode the alternative assets.

4. The decoding device of claim 1, wherein the processor is further configured to identify the V3C content using the group identifier in the asset reference descriptor.

5. The decoding device of claim 1, wherein:
the communication interface is further configured to receive a signaling message indicating a portion of a bitstream in each asset of the group and a corresponding region to be occupied by the portion of the bitstream, and
the processor is further configured to decode the portions of the asset corresponding to regions visible to a user.

6. The decoding device of claim 5, wherein the processor is further configured to identify a number of 3D spatial region information included in the signaling message and information of 3D spatial regions covered by an asset.

7. The decoding device of claim 5, wherein the processor is further configured to identify a number of assets whose asset specific information is included in the signaling message.

8. A method comprising:
receiving, by a communication interface of a decoding device, a plurality of independent bitstreams containing visual volumetric coding (V3C) content;
receiving, by the communication interface, a grouping message indicating a group of assets from the plurality of independent bitstreams containing the V3C content, wherein the grouping message is a descriptor indicating a reference relationship between assets in the group;
selecting, by a processor operably coupled to the communication interface, the group of assets based on the grouping message;
identifying a group identifier for the selected group of assets in the V3C content,
identifying reference relationship information for each asset in the group of assets included in the V3C content based on an asset identifier for each asset in the group of assets included in an asset reference descriptor with the group identifier; and
decoding, by the processor, at least the selected group of assets.

9. The method of claim 8, further comprising identifying, by the processor, information indicating a number of assets in the group of assets.

10. The method of claim 8, further comprising:
identifying information indicating alternative assets in the grouping message; and
decoding the alternative assets.

11. The method of claim 8, further comprising:
identifying, by the processor, the V3C content using the group identifier in the asset reference descriptor.

12. The method of claim 8, further comprising:
receiving, by the communication interface, a signaling message indicating a portion of a bitstream in each asset of the group and a corresponding region to be occupied by the portion of the bitstream; and
decoding, by the processor, the portions of the asset corresponding to regions visible to a user.

13. The method of claim 12, further comprising:
identifying, by the processor, a number of 3D spatial region information included in the signaling message and information of 3D spatial regions covered by an asset.

14. The method of claim 12, further comprising:
identifying, by the processor, a number of assets whose asset specific information is included in the signaling message.

15. A point cloud encoding device comprising:
a processor configured to:
receiving a group of assets;
identify a group identifier for the group of assets;
identify reference relationship information for each asset in the group of assets based on an asset identifier for each asset in the group of assets included in an asset reference descriptor with the group identifier; and
encode a grouping message indicating the group of assets for a plurality of independent bitstreams containing visual volumetric coding (V3C) content, wherein the grouping message is a descriptor indicating a reference relationship between assets in the group and includes the group identifier and the reference relationship information, and a communication interface operably coupled to the processor and configured to transmit the plurality of independent bitstreams and the grouping message.

16. The encoding device of claim 15, wherein:
the grouping message is a descriptor indicating a reference relationship between assets in the group, and
the processor is further configured to encode information related to a number of asserts in the group of assets in the grouping message.

17. The encoding device of claim 15, wherein the processor is further configured to:
encode assets included in the V3C content based on asset identifiers included in the asset reference descriptor.

18. The encoding device of claim 15, wherein the processor is further configured to encode the V3C content using the group identifier in the asset reference descriptor.

19. The encoding device of claim 15, wherein the processor is further configured to:
encode a number of 3D spatial region information included in a signaling message and information of 3D spatial regions covered by an asset, and
encode a number of the assets whose asset specific information is included in the signaling message.

20. The encoding device of claim 15, wherein:
the processor is further configured to encode a signaling message indicating a portion of a bitstream in each asset of the group and a corresponding region to be occupied by the portion of the bitstream, and
the communication interface is further configured to transmit the signaling message with the plurality of independent bitstreams and the grouping message.

* * * * *